(12) United States Patent
Li et al.

(10) Patent No.: US 11,645,198 B2
(45) Date of Patent: May 9, 2023

(54) BUFFER POOL MAINTENANCE IMPROVEMENT

(71) Applicant: International Business Machines Corporation, Armonk, NY (US)

(72) Inventors: Shuo Li, Beijing (CN); Xiaobo Wang, Beijing (CN); Sheng Yan Sun, Beijing (CN); Hong Mei Zhang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/115,299

(22) Filed: Dec. 8, 2020

(65) Prior Publication Data

US 2022/0179782 A1   Jun. 9, 2022

(51) Int. Cl.
 *G06F 12/02* (2006.01)
 *G06F 13/16* (2006.01)
 *G06F 12/123* (2016.01)
 *G06F 12/0882* (2016.01)

(52) U.S. Cl.
 CPC ...... *G06F 12/0246* (2013.01); *G06F 12/0882* (2013.01); *G06F 12/123* (2013.01); *G06F 13/1673* (2013.01)

(58) Field of Classification Search
 CPC .......... G06F 12/0246; G06F 12/0882; G06F 12/123; G06F 13/1673
 See application file for complete search history.

(56) References Cited

U.S. PATENT DOCUMENTS

| | | | | |
|---|---|---|---|---|
| 2004/0098541 | A1* | 5/2004 | Megiddo | G06F 12/122 711/129 |
| 2008/0005501 | A1* | 1/2008 | Watanabe | G06F 12/0866 711/154 |
| 2010/0281230 | A1* | 11/2010 | Rabii | G06F 12/121 711/165 |
| 2013/0080689 | A1* | 3/2013 | Jo | G06F 12/0246 711/103 |

(Continued)

FOREIGN PATENT DOCUMENTS

CN   110321079 A   10/2019

OTHER PUBLICATIONS

Wu et al., "A Multiple LRU List Buffer Management Algorithm," IOP Conference Series: Materials Science and Engineering 569, 2019, 10 pages, doi:10.1088/1757-899X/569/5/052002, https://iopscience.iop.org/article/10.1088/1757-899X/569/5/052002/meta.

(Continued)

*Primary Examiner* — Tasnima Matin
(74) *Attorney, Agent, or Firm* — Peter J. Edwards (57) ABSTRACT

A method of managing a storage system comprises detecting a reference to a first page in the storage system. The method also comprises creating a first candidate block for the first page based on the detecting. The first candidate block may comprise a continuous series of pages that begins with the first page. The method also comprises monitoring subsequent references to pages within the first candidate block. The method also comprises determining that the first candidate block meets a first set of hot-block requirements. The method also comprises relocating the first candidate block to a hot-block space in a buffer pool based on the determining, resulting in a first hot block.

25 Claims, 7 Drawing Sheets

(56) References Cited

U.S. PATENT DOCUMENTS

| | | | |
|---|---|---|---|
| 2013/0227218 A1* | 8/2013 | Chang | G06F 12/0866 711/118 |
| 2013/0311698 A1* | 11/2013 | Cheng | G06F 12/0246 711/103 |
| 2014/0068207 A1* | 3/2014 | Aslot | G06F 12/12 711/160 |
| 2014/0164687 A1* | 6/2014 | Kwon | G06F 3/0616 711/103 |
| 2016/0210044 A1* | 7/2016 | Mitkar | G06F 3/0656 |
| 2016/0306554 A1* | 10/2016 | Li | G06F 3/0653 |
| 2018/0089107 A1* | 3/2018 | Yan | G06F 12/0862 |
| 2019/0179763 A1 | 6/2019 | Lo | |
| 2019/0278706 A1* | 9/2019 | Hong | G06F 3/064 |
| 2019/0310949 A1 | 10/2019 | Lev et al. | |
| 2020/0019506 A1 | 1/2020 | Ray et al. | |
| 2020/0218668 A1 | 7/2020 | Han | |

OTHER PUBLICATIONS

Taekyung Heo et al., "Adaptive Page Migration Policy With Huge Pages in Tiered Memory Systems," IEEE Transactions on Computers, vol. 71, No. 1, Jan. 2022, 16 pages.

* cited by examiner

BUFFER POOL MAINTENANCE IMPROVEMENT

BACKGROUND

The present disclosure relates to memory management, and more specifically, to identifying data to be transferred between memory tiers.

Some memory systems, such as memory systems that support database operations, include one or more buffer pools. A buffer pool is an area of a relatively fast tier of memory in which data that has been recently used is kept. Memory systems sometimes move data from the buffer pool to a relatively slower tier of memory if the data has not been used recently. Some memory systems utilize a "least recently used" list, in which a list of the data blocks in the buffer pool are organized based on how recently they have been used. Such memory systems typically maintain the least-recently-used list during system operation, and transfer data blocks from the buffer pool to slower tiers as needed based on the list.

SUMMARY

Some embodiments of the present disclosure can be illustrated as a method of managing a storage system. The method comprises detecting a reference to a first page in the storage system. The method also comprises creating a first candidate block for the first page based on the detecting. The first candidate block may comprise a continuous series of pages that begins with the first page. The method also comprises monitoring subsequent references to pages within the first candidate block. The method also comprises determining that the first candidate block meets a first set of hot-block requirements. The method also comprises relocating the first candidate block to a hot-block space in a buffer pool based on the determining, resulting in a first hot block.

Some embodiments of the present disclosure can also be illustrated as a processor and a memory in communication with that processor. The memory contains program instructions that, when executed by the processor, are configured to cause the processor to perform the method described above.

Some embodiments of the present disclosure can also be illustrated as a computer program product. The computer program product comprises a computer readable storage medium having program instructions embodied therewith. When executable by the computer, the program instructions cause the computer to perform the method described above.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to memory management, and more specifically, to identifying data to be transferred between memory tiers. While the present disclosure is not necessarily limited to such applications, various aspects of the disclosure may be appreciated through a discussion of various examples using this context.

Many types of computer systems, such as database systems, utilize multiple tiers of storage. In these computer systems, larger, slower tiers of storage (e.g., tape drives, spinning hard disks) often store large amounts of data that the computer system does not need frequently. Smaller, faster tiers of storage (e.g., random-access memory; hereinafter "RAM") often store smaller amounts of data that the computer either needs frequently or needs currently.

Many of these computer systems also utilize methods to facilitate maintaining records of the data that is in the relatively slow tiers of storage and data that is in the relatively fast tiers of storage. For example, some such computer systems utilizing "paging," in which data is organized into same-size blocks (e.g., a particular number of kilobytes). A storage controller may maintain a record of the particular pages that have been relocated from the slower tier of storage (e.g., a hard disk drive) to the faster tier of storage (e.g., RAM, cache), rather than maintaining a record of the start and stop addresses of all the data in the faster tier.

Computer systems that utilize paging often maintain a section of a fast storage tier that is reserved for pages that have been relocated to that fast storage tier. This section is often called a buffer pool. For example, a system's RAM may contain a section that can only be occupied by pages that have been relocated from the system's solid state drive. When a page is relocated to RAM, it may be placed in the buffer pool.

Computer systems that maintain paging and a buffer pool often also utilize methods to determine which pages in the buffer pool are still likely to be needed in the near future, and, on the other hand, which pages in the buffer pool can be relocated back to a slower tier of storage. A common method is referred to as a least-recently-used (also referred to herein as "LRU") list of pages. This LRU list of pages may also be referred to herein as an "LRU list" or an "LRU chain." In computer systems that utilize an LRU list, a storage controller typically maintains a record of the most recent timestamp (e.g., date and time) that each page in the buffer pool has been referenced (e.g., by a "GetPage" operation of a query). The storage controller typically orders the pages such that the pages that have been referenced most recently are placed at one end of the LRU list and the pages that have been referenced least recently are placed at the opposite end of the LRU list. When a page is referenced (i.e., called to the buffer pool), it moves to the "most-recent" end of the LRU list, and each page after it shifts towards the least recently referenced end of the LRU list.

If that referenced page was not previously in the LRU list, all pages of the LRU list shift, typically resulting in the least-recently used page being relocated back to a slower storage tier. However, if the referenced page was already in the LRU list the pages in the LRU list are reorganized (e.g., the pages that were previously referenced more recently than the referenced page are shifted, but the pages that were previously referenced less recently than the reference page remain in the same position).

Even though a page that is already in the LRU being referenced does not typically result in any relocations from or to the LRU list (i.e., the buffer pool), the shifting of pages in the LRU list still requires system resources. For example, reordering the pages in the list and recording the new order of pages requires that a buffer-pool directory be updated. This update is sometimes referred to as a buffer-pool maintenance latch. In some systems, the buffer-pool maintenance latch may not actually involve any data being relocated in memory at all. In other words, the pages themselves in the buffer pool are not relocated; rather, they are just assigned to different positions on the LRU list. Thus, the resources required to perform this buffer-pool maintenance are not providing any real change to the storage system.

Unfortunately, in some computer systems (e.g., databases with repetitive, periodic queries), buffer pool maintenance latch may represent a very large proportion of the activities of a storage controller maintaining the buffer pool. In these computer systems, the list of pages in the buffer pool may remain relatively similar over a period of time, but the order of those pages in the LRU list may change frequently as different pages in the list are referenced. In these computer systems, the high percentage of resources spent on the buffer pool maintenance latch result in resources being spent that do not contribute to accomplishing the purpose of the LRU list or improve the performance of the buffer pool. This is because the purpose of the LRU list is to assist in determining which page(s) from the buffer pool should be relocated to a slower storage tier when necessary. However, in these computer systems, relocations to slower storage tiers are relatively infrequent compared to other computer systems. However, the buffer pool maintenance latch is still used very frequently. Thus, the same amount, or a greater amount, of resources may be utilized to maintain the LRU list, even though the LRU list may actually be used less frequently than other computer systems.

For these reasons, computer systems for which a large number of page references are for pages that are already located in the buffer pool would benefit from a new method of organizing the buffer pool. Such a method would preferably reduce the amount of buffer pool maintenance latches for those large number of page references.

Some embodiments of the present disclosure address these issues by dividing the buffer pool into two sections (sometimes referred to herein as "spaces"). The first space of the buffer pool is a least-recently used space (sometimes referred to herein as the "LRU space"), in which pages that are being tracked on an LRU list are located. The relocation of these pages from and to disk may, absent any interaction with the second buffer pool space, occur by similar means to those discussed above. For example, if a page is referenced in a system with a 1,000 page LRU list, it may be relocated to the LRU space of the buffer pool. At that point, it would be the $1^{st}$-most-recent page in the LRU list (e.g., page number 1 on the LRU list). However, if that page is not referenced again after 999 more unique pages are referenced, the page would become the 1,000-most-recent page in the LRU list (e.g., page number 1,000 on the LRU list). Thus, the page would then be the next page to be relocated to disk from the buffer pool if the LRU space needed more space.

The second space of the buffer pool is referred to herein as a hot-block space. Unlike the LRU space, the hot-block space stores "blocks" of pages, rather than individual pages. A block of pages, as used herein, refers to a series of continuous pages of a specified size. For example, if a particular block is 5 pages long, the five pages in the block would all have adjacent storage addresses (e.g., addresses on a hard disk).

The hot-block section of space stores blocks that have been categorized as "hot." Whether a block is "hot" or not "hot" is intended to be representative of how actively the computer system is using those pages. In order for a block to be considered a hot block, a certain set of hot-block requirements related to the system's pattern of page references must be met. For example, a typical set of hot-block requirements may be a threshold of page references in that block. In other words, a threshold number of a block's pages must be referenced within a certain amount of time. For example, a set of hot-block requirements may be 70% of the block's pages being referenced. Thus, if a 10-page block has had 6 pages referenced, it would not be considered hot. However, once the seventh page in that block is referenced, the set of requirements would be met and the block would be considered hot. All pages in the block could then be relocated to the hot-block space of the buffer pool. Any pages in the block that were, up until that point, previously located in the LRU space may also be relocated there.

The pages in a hot block may then remain in the hot block space in the buffer pool until the block is no longer considered sufficiently hot. For example, if the average reference time of the pages in a "hot" block drops below a threshold (e.g., 2 references in 10 seconds), the block may be removed from the hot-block space. The pages in the block may then be separated based on how recently they were referenced. For example, if a 32-page block is relocated from the hot block, 5 pages that have been referenced very recently may be relocated to the LRU space, whereas the remaining 27 pages that have not been referenced recently may be relocated back to a slower tier of storage.

While the pages in a hot block are stored in a hot-block queue, they are not located in the LRU space, and thus there is no need for them to be referenced in the LRU list. For that reason, when the pages in the hot-block space are referenced, the LRU list does not need to be reorganized, and no buffer-pool maintenance latch occurs as a result. For systems with some blocks of adjacent pages that are referenced quite regularly, this can result in a significant performance gain.

However, different systems with different patterns of activity (e.g., typical queries), database sizes, and user preferences may benefit from the hot-block space to varying degrees. For this reason, some embodiments of the present disclosure enable several aspects of the hot-block space to be configurable. For example, the size of the hot block space and the LRU space may be configurable. Thus, users of systems that very frequently reference the same pages, rather than reference all pages in the system with equal frequency may benefit from increasing the size of the hot-block space and decreasing the size of the LRU space. The size of blocks may also be configurable. Thus, blocks for very large databases with a large number of subsequent pages may be set larger than those for small databases. The sets of hot-block requirements may also customizable as well. Thus, users who are particularly concerned about wasting buffer-pool space by bringing in pages in a block that are not referenced may set restrictive sets of requirements, whereas users who are particularly concerned about avoiding unnecessary LRU maintenance may set relaxed sets of requirements. Requirements may take different forms as well. For example, a system may require that a certain percentage of pages in a block to be referenced several times, or a certain percentage of pages in a section of a block (e.g., the first half of a block) to be referenced. Some sets of requirements may even be met based on reference patterns of other blocks. For example, a hot-block requirement may require that a certain percentage of pages in a previous adjacent block to be referenced.

Figure 1:
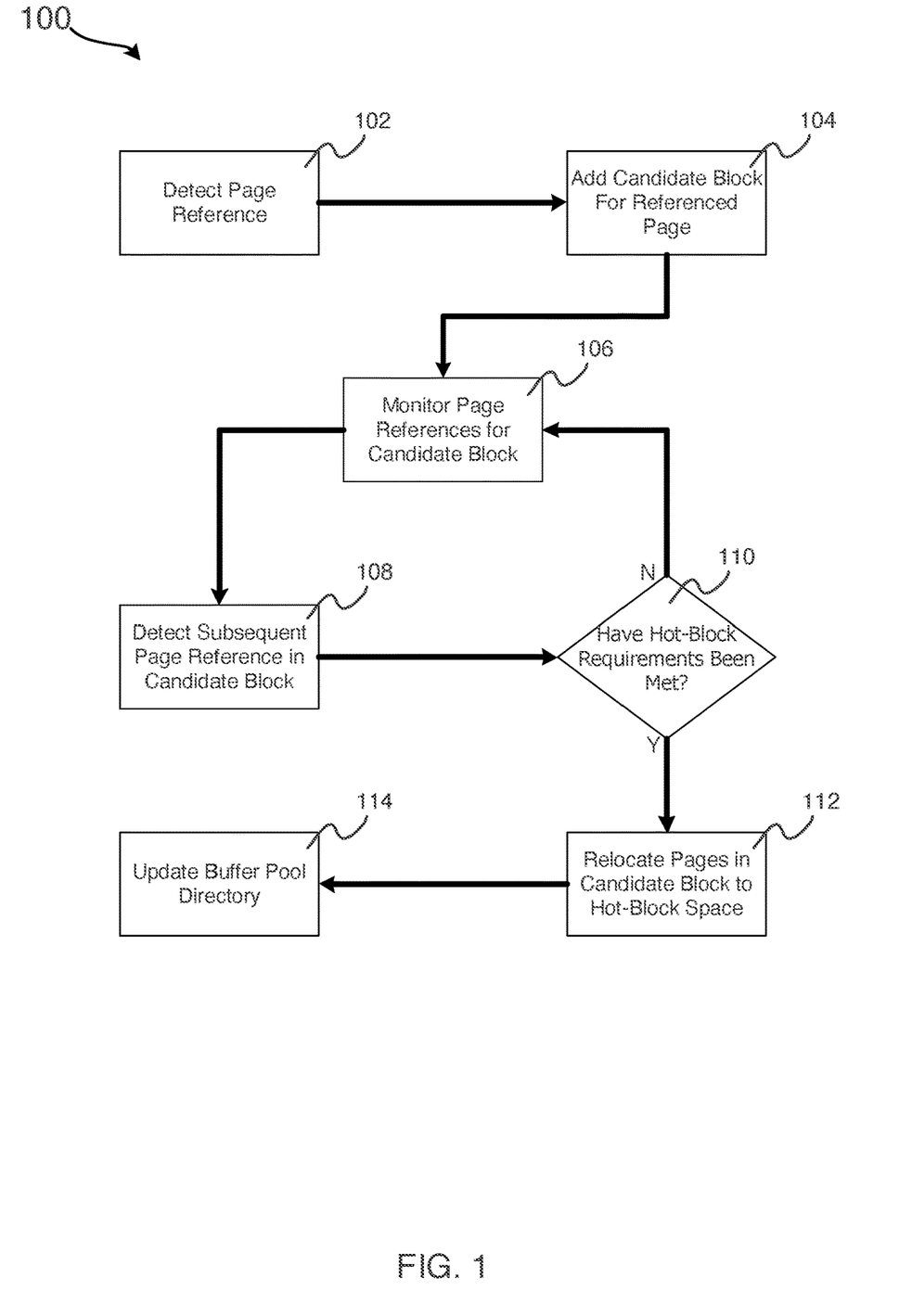
FIG. 1 depicts a method of relocating a block of pages to a hot-block space in a buffer pool, in accordance with embodiments of the present disclosure.

FIG. 1 depicts a method 100 of relocating a block of pages to a hot-block space in a buffer pool, in accordance with embodiments of the present disclosure. Method 100 may be performed, for example, by a storage controller of a computer system, a central processing unit in the computer system, a host of the computer system, or a hypervisor of a system. For the purpose of this discussion, the actions of method 100 will be referenced as performed by "the system." Method 100 begins in operation 102 in which the system detects a page being referenced. As discussed previously, this may often occur due to a "get page" operation of a query, but other page-reference operations are also possible.

Once the address of the page is found, a candidate block is created for the page in operation 104. A candidate block, as used herein, is a hypothetical block that includes the referenced page as the first page. The size of the candidate block may equal the size configured for hot blocks in that portion of the system (e.g., for the database in which the data in the referenced page is located). Thus, if a hot block is configured to be 16 pages, operation 104 may include creating a candidate block that includes the referenced page and the subsequent 15 pages at that page's location (e.g., the referenced page's location on hard disk).

The system may then monitor the patterns by which pages in the candidate block are configured to determine whether any hot-block requirements are met in the remainder of method 100. While the referenced page, and any subsequently referenced pages in the candidate block, may be temporarily relocated to the LRU space upon being referenced, the system may still monitor the references of the block as if the pages were still adjacent.

Thus, the system may monitor the page references for the candidate block in operation 106, and may detect a subsequent page reference in the candidate block in operation 108. For example, the system may detect, in operation 108, a reference to the second page in the candidate block (i.e., the page that immediately follows the page that was referenced in operation 102), or a reference to several pages after.

Upon detecting a subsequent page reference in operation 108, the system determines, in operation 110, whether the hot-block requirements for the candidate block has been met. This may involve, in some embodiments, comparing the system's page-reference patterns to the required reference patterns for the candidate block. These hot-block requirements may vary based on the implementation and the preferences of the system administrators.

For example, if smaller blocks are being utilized (i.e., if the candidate block created at operation 104 is small), a relaxed set of requirements may be more desirable (e.g., a set of requirements that are easy to meet), because moving the small block to the hot-block space would not take up a large amount of space in the buffer pool. On the other hand, if larger blocks are being utilized, a strict set of requirements (e.g., a set of requirements that are hard to meet) may be more desirable to avoid the risk of taking up a large amount of buffer-pool storage with a block whose pages are not actually used frequently.

Similarly, some users (e.g., database owners, database operators, system administrators) may be particularly focused on avoiding using up buffer-pool space, and thus may prefer to only move an entire block to the hot-block space when the requirements of a strict set of requirements is met. On the other hand, some users may be particularly focused on avoiding unnecessary LRU space maintenance, and thus may prefer to move a block to the hot-block space as soon as the requirements of a relaxed set of requirements are met.

In some embodiments, a rather straight-forward set of requirements may be utilized in operation 110. For example, the hot-block requirements may require that 50% of the pages in the candidate block be referenced in a particular time period (e.g., one minute). In some embodiments, the set of requirements could take on more complicated forms. For example, the hot-block requirements may require that at least 30% of the pages in the candidate block be referenced once, at least 10% be referenced a second time, and that at least 2 adjacent pages in the candidate block be referenced in order.

If the system determines, in operation 110, that the hot-block requirements have not been met, the system may return to operation 106 to continue to monitor page references for the candidate block. However, if the system determines that the hot-block requirements have been met, the system proceeds to relocate the pages in the candidate block to the hot-block space in operation 112. At this point, the candidate block may be referred to as a "hot block."

In some instances, operation 112 may include moving some pages that were previously relocated to the LRU space to the hot-block space. In some embodiments, this relocation may be a logical relocation, but may not actually involve moving the pages in the block to a different physical location in memory. Rather, the pages in the hot block that are "relocated" from the LRU space to the hot-block space may simply be categorized by the system as in the hot-block space, and the system may remove them from the LRU list. Of note, any pages in the hot block that were previously located in disk (e.g., pages that had not been referenced) would, in typical storage systems, be relocated from a slower tier of storage (e.g., a hard disk drive) to the memory on which the hot-block space is located.

Once the hot-block is relocated to the hot-block space in operation 112, the system updates the buffer pool directory in operation 114. This is performed to enable the system to track the pages in the hot block. The precise information required may vary based on the embodiment, but in typical embodiments the information should provide a way for the system to calculate the size of the hot block and the memory address of the hot block. For example, the buffer pool directory could identify the memory address of the first page in the hot block and the number of pages in the hot block. From that information, the system could locate the hot block in memory, and would be able to calculate the memory position of each subsequent page in the hot block based on the page size of the system. Further, the system would also be able to calculate the end of the hot block based on the number of pages in the hot block. Other information that could be included in the directory is the block end point, the size of the block in memory (e.g., in megabytes), the identification of the first page and the identification of the last page, etc.

Upon relocating the hot block to the hot-block space in the buffer pool, the system could then monitor the page-reference patterns for the hot block, and retain the hot block in the hot-block space until it no longer qualifies as "hot." The requirements for remaining "hot" may vary based on the embodiment and implementation, and are discussed in connection with FIG. 4.

Method 100 discloses relocating a single candidate block and using a single set of hot-block requirements. However, in some embodiments it may be beneficial to utilize multiple sets of hot-block requirements to facilitate relocating several candidate blocks to the hot-block space in a short period of time. This may be beneficial, for example, if a query references 100 pages, yet the block size for the system is 25 pages. In this example, the system may end up relocating four (or more) hot blocks associated with the query in a short period of time. For example, a candidate block of 25 pages may be created when the first page of the 100 pages is referenced. Twenty of those twenty-five pages in the candidate block may be referenced by the query, which may be sufficient to meet the hot-block requirements. The same may then be true for the next candidate block, resulting in 5 candidate blocks being relocated to the hot-block space. In some implementations, it may be fairly common for the queries run by the system to reference more pages than could fit in a candidate block, resulting in many situations in which multiple adjacent candidate blocks are relocated to the hot-block space.

In these situations, it may be beneficial to relax the hot-block requirements of a candidate block if that candidate block immediately follows a block was relocated to storage. In the previous example, therefore, it may be beneficial to use a less strict set of hot-block requirements for the second candidate block (e.g., the block associated with pages 20-40 of the query) if it is assumed that the previous candidate block (i.e., the first candidate block) becoming a hot block makes it more likely that the second candidate block will become a hot block. This may enable the system to relocate the subsequent candidate blocks (e.g., candidate blocks 2-5) to the hot-block space after fewer page references, reducing the number of LRU space maintenance operations (e.g., buffer pool maintenance latches) before the candidate block is relocated.

The extent to which the set of requirements should be relaxed may depend upon the embodiment and implementation. For example, while utilizing a very relaxed set of requirements for subsequent candidate blocks may avoid maintenance latches, it may also increase the likelihood of relocating a candidate block that does not actually become "hot" to the hot-block space. For example, if a first candidate block is 16 pages and all 16 are referenced in a row by a query, it may increase the chances that the query will also reference a significant amount of the pages in the second candidate block (e.g., the block that begins with the $17^{th}$ page, which is adjacent to the $16^{th}$ page) causing that block to become "hot" as well. However, setting the hot-block requirements very relaxed for the second candidate block (e.g., a requirement that the first two pages are referenced) may result in the second candidate block being relocated to the hot-block space even if the query only references the first 3 pages of the second candidate block. In this situation, the benefits of relocating the second candidate block (e.g., avoiding potential maintenance latches due to storing the first three pages of the second candidate block in the LRU space) may be outweighed by the detriments of storing the entire 16-page block in the hot-block space. For this reason, the hot-block requirements for subsequent blocks may need to be customized for each system and each situation in order to maximize the benefit gained by avoiding maintenance latches while minimizing the risk of needlessly occupying buffer pool space with a "hot block" that only contains a very small percentage of hot pages.

Figure 2:
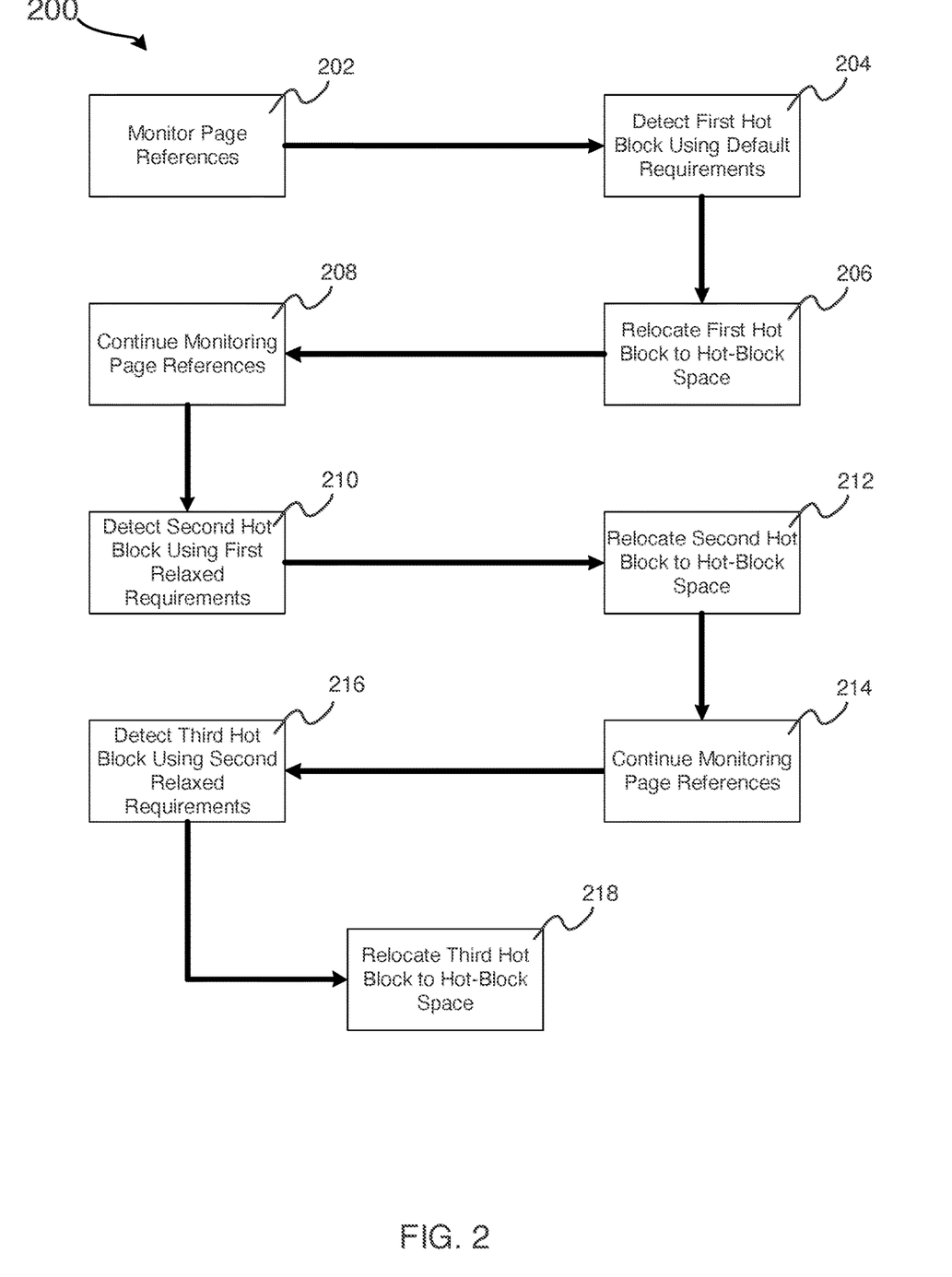
FIG. 2 depicts a method of utilizing default and relaxed sets of hot-block requirements, in accordance with embodiments of the present disclosure.

FIG. 2 depicts a method 200 of utilizing default and relaxed sets of hot-block requirements, in accordance with embodiments of the present disclosure. Like method 100, method 200 may be performed, for example, by a storage controller of a computer system, a central processing unit in the computer system, a host of the computer system, or a hypervisor of a system. For the purpose of this discussion, the actions of method 200 will be referenced as performed by "the system."

Method 200 begins in operation 202, in which page references for the system are monitored. Through the page references that are monitored in operation 202, the system detects, in operation 204, that a first candidate block meets a default set of requirements for a hot block. For example, the default set of requirements may state that a candidate block becomes hot if 50% of its pages are referenced. In this example, therefore, the system would detect in operation 204 that 50% of the pages in a first candidate block had been referenced.

As a result of detecting a first hot block in operation 204, the system relocates the first hot block to the hot-block space of the buffer pool in operation 206. As discussed previously, this may include relocating some of the first hot block's pages from another tier of storage, and some of the first hot block's pages from the LRU space.

After detecting the first hot block in operation 204, the system would also continue to monitor page references in operation 208, which may resemble the operations of operation 202. In some embodiments, operation 208 may be a continuation of operation 202. For example, the system may monitor page references throughout the entire process of method 200. Through the page references that are monitored in operation 208, the system detects, in operation 210, a second hot block using a first relaxed set of hot-block requirements. In some embodiments, the first relaxed hot-block requirements may resemble the default hot block requirements utilized in operation 204, but may be less strict. For example, the default hot-block requirements may require that 50% of the first candidate block's pages be referenced, whereas the first relaxed hot-block requirements may require that 40% of the second candidate block's pages be referenced. Similarly, the first set of relaxed hot-block requirements may require that 50% of the first half of the pages in the second candidate block be referenced (i.e., the requirements may require that 25% of the pages in the second candidate block be referenced if those 25% are in the first half of the second candidate block). In other embodiments, the form of the first set of relaxed hot-block requirements may differ from the default requirements. For example, the first set of relaxed requirements may require that 10% of the pages in the second candidate hot block be referenced twice.

After detecting the second hot block in operation 210, the system relocates the second hot block to the hot-block space in operation 212, and continues to monitor the page references in operation 214. Through the page references that are monitored in operation 216, the system detects, in operation 216, a third hot block using a second set of relaxed hot-block requirements. In some embodiments, the second set of relaxed hot-block requirements may take a similar form to the default requirements and first relaxed requirements. For example, if the default requirements require that 50% of the pages in the first candidate block be referenced, and the first set of relaxed requirements require that 25% of the pages in the second candidate block be referenced, the second set of relaxed requirements may require that 15% of the pages in the third candidate block be referenced.

In some embodiments, the second set of relaxed hot-block requirements may take a different form than one of the default hot-block requirements and the first set of relaxed hot-block requirements. For example, the default hot-block requirement may require that 50% of the pages in the first candidate block be referenced, and the first set of relaxed hot-block requirements may require that 50% of the pages in the first 50% of the second candidate block be referenced. However, the second set of relaxed requirements may not relate to the pages in the third candidate block. Rather, the second set of relaxed requirements may require that 50% of the pages in the second 50% of the second 50% of the second candidate block be referenced. This may be beneficial, for example, to take advantage of trends in which a very large portion of the pages in both the first and second candidate blocks are being referenced. In the presence of these trends, it may be very likely that the third candidate block may also become a candidate block, and thus it may be worthwhile to relocate the third candidate block to the hot-block space before any page of the third candidate block is referenced.

Regardless of the form taken by second set of relaxed hot-block requirements, the system may, as a result of detecting the third hot block in operation 216, relocate the third hot block to the hot-block space in 218. In some embodiments of method 200, this may result in the first, second, and third hot block occupying adjacent locations in the buffer pool, effectively creating one long series of related pages that may be frequently accessed without maintaining the LRU list.

Figure 3A:
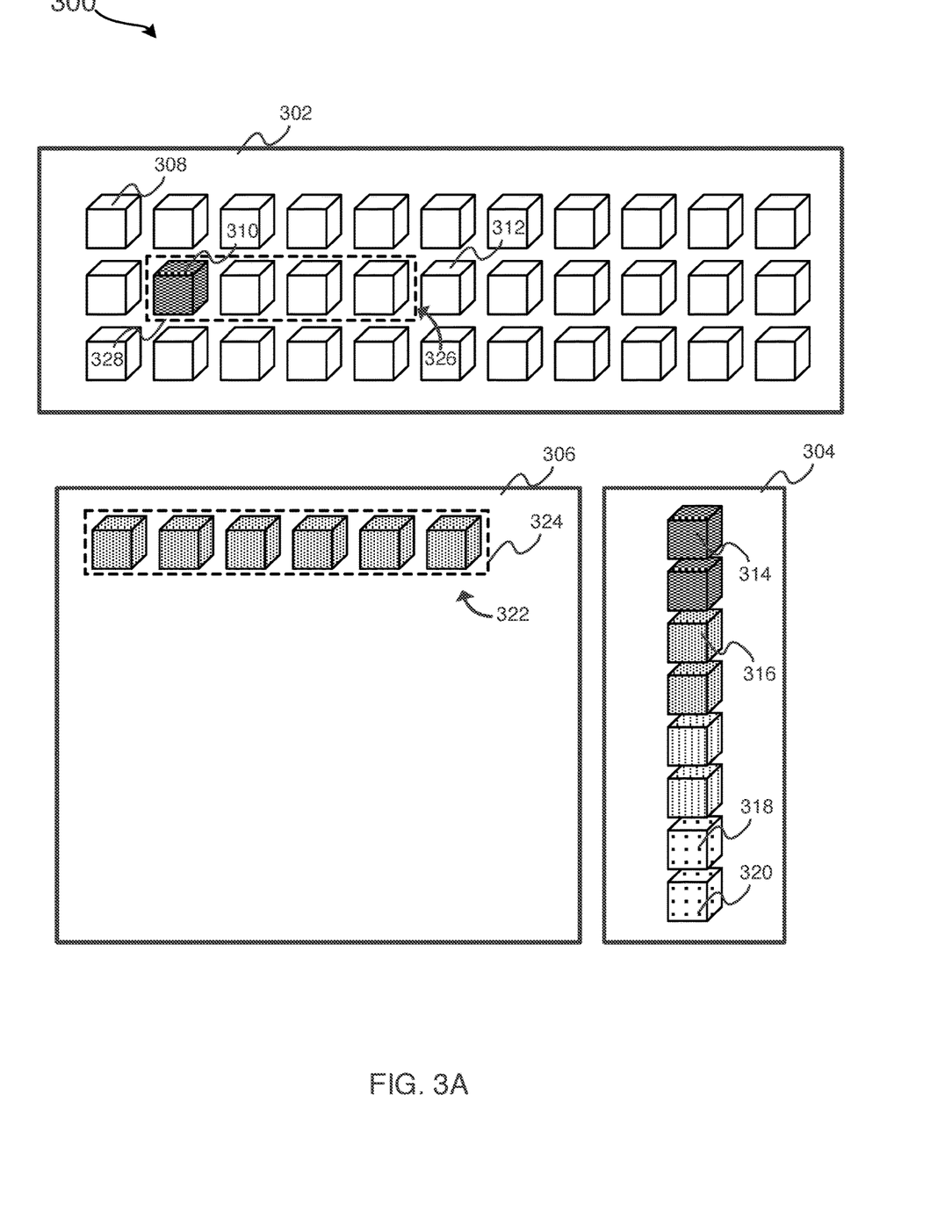
FIG. 3A depicts a first view of a storage system with a hot-block space after creation of a candidate block, in accordance with embodiments of the present disclosure.
Figure 3B:
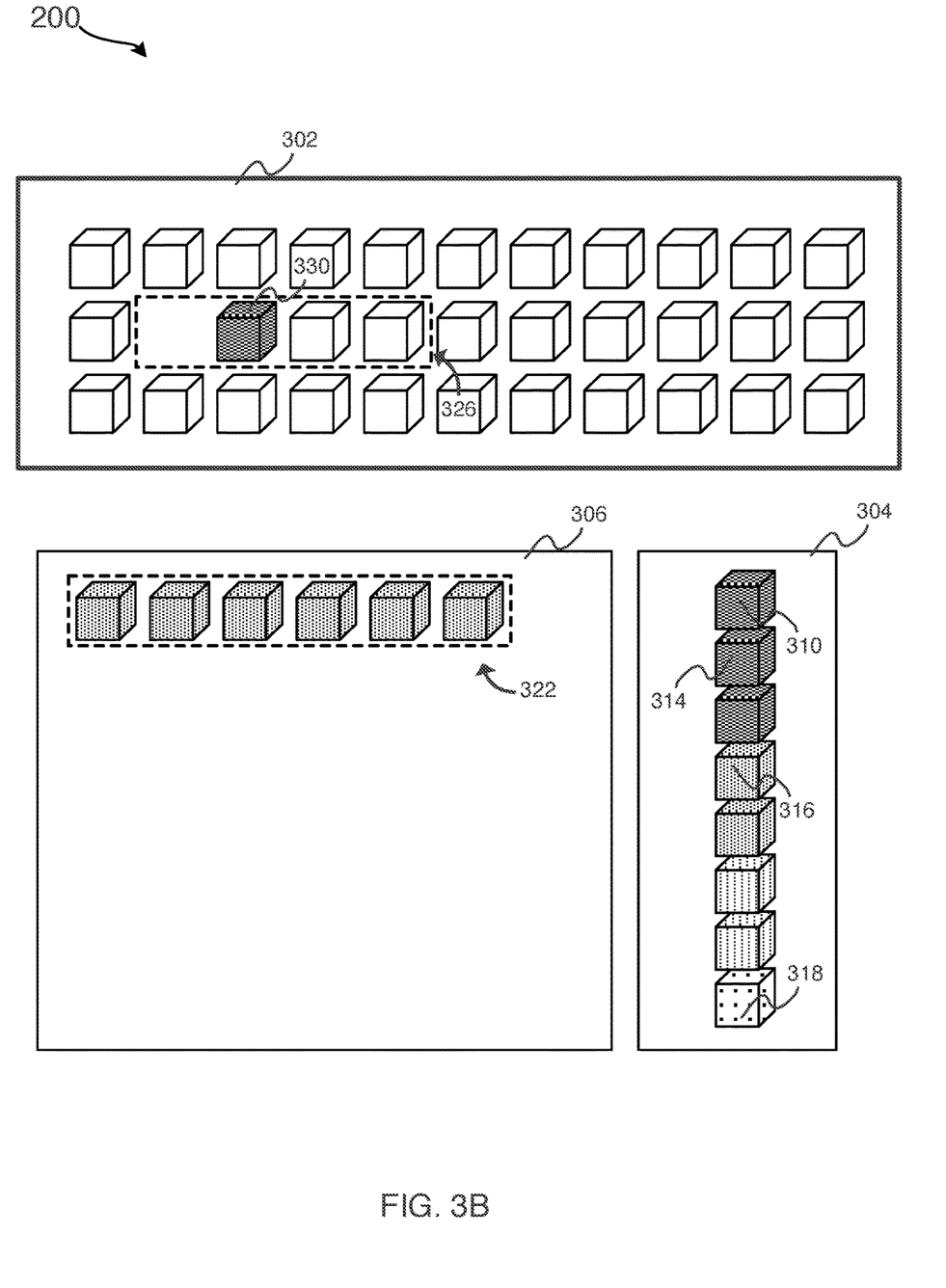
FIG. 3B depicts a second view of a storage system with a hot-block space upon the hot-block requirements for the candidate block being met, in accordance with embodiments of the present disclosure.
Figure 3C:
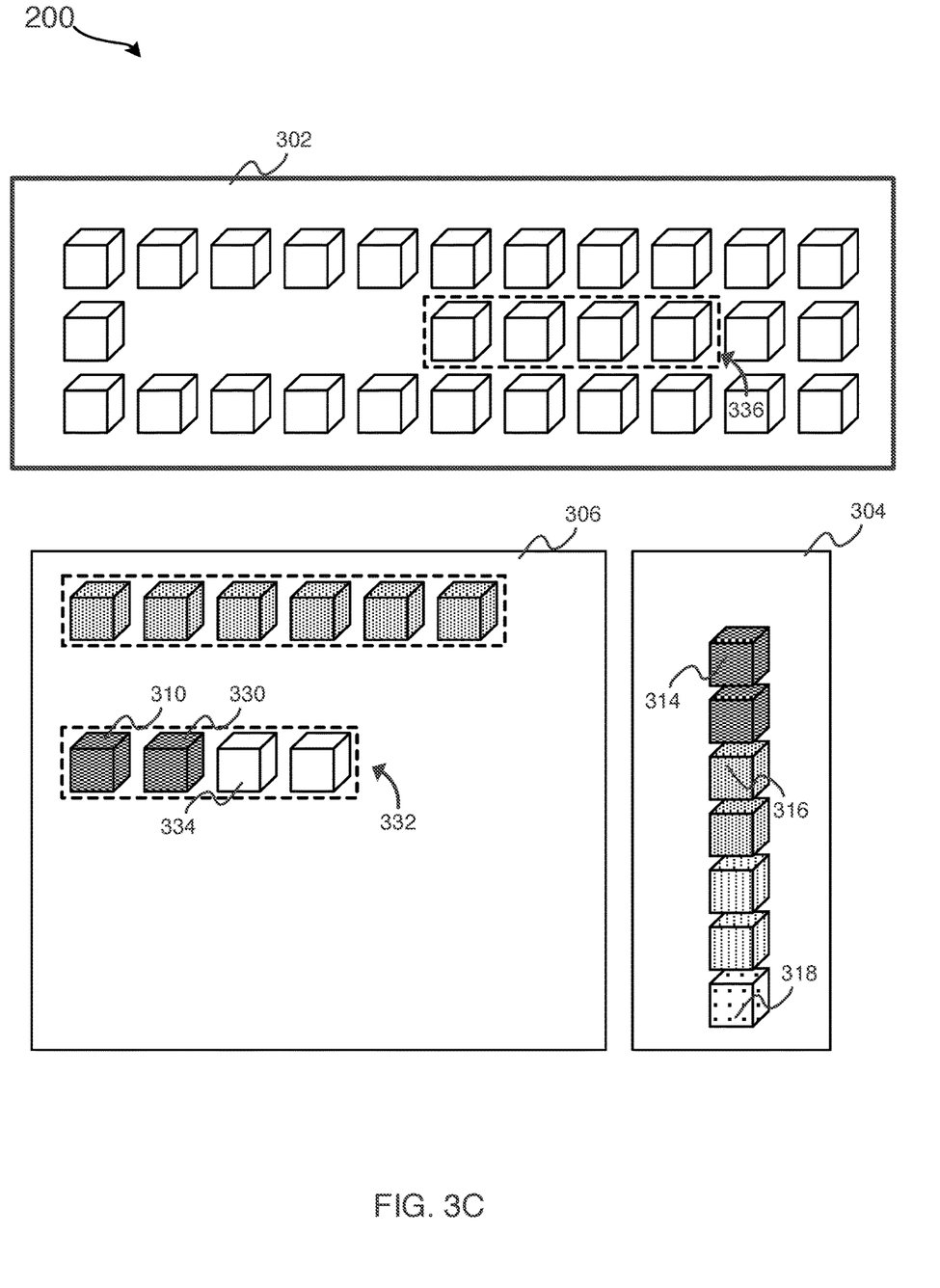
FIG. 3C depicts a third view of a storage system in which the candidate block is relocated to the hot-block space, in accordance with embodiments of the present disclosure.

For the purposes of understanding, FIGS. 3A through 3C depict an abstracted presentation of storage system 300 utilizing some embodiments of the present disclosure. It is important to note that the elements illustrated in FIGS. 3A through 3C are presented for the purposes of understanding only, not for precision. Thus, the elements are illustrated as basic representations of storage-system components. However, the number and size of the elements is not necessarily intended to be representative of an accurate reduction to practice of the embodiments of this disclosure.

FIG. 3A depicts a first view of storage system 300 with a hot-block space after creation of a candidate block, in accordance with embodiments of the present disclosure. Storage system 300 depicts low-tier storage 302, such as a hard-disk drive, tape drive, or solid-state drive. Storage system 300 also depicts LRU space 304 and hot-block space 306, both of which are located within a buffer pool of a higher-tier storage, such as a random-access memory or cache. Low-tier storage 302 contains a large number of pages, such as pages 308, 310, and 312. LRU space 304 contains, as illustrated, eight pages, such as pages 314, 316, 318, and 320. Hot-block space 306 contains, as illustrated, a single hot block 322, represented by six pages enclosed by dotted line 324. As such, hot block 322 may have originated from a section of storage system 300 in which the default block size is 6 pages.

In some embodiments, the size of hot-block space 306 and the size of LRU space 304 may be configurable based on system properties and user preferences. Databases that tend to run queries in which many pages are called in order would likely benefit from a larger hot-block space. Databases that tend to run queries in which most queries only reference a few pages, reference pages that are not near each other, or reference pages without a particular patter, may benefit from a larger LRU space and a smaller hot-block space.

For the sake of understanding, the time period since a page has been referenced in FIGS. 3A through 3C is represented by the darkness with which those pages are hatched. For example, page 314 in LRU space 304 is darkly hatched, suggesting that it was recently referenced. Page 316 and the pages within hot block 322, however, are slightly less darkly hatched, indicating that they have been referenced slightly less recently than page 314. Further, pages 318 and 320 are lightly hatched, indicating that they have been referenced less recently than pages 314 and page 316. Pages 308 and 312, on the other hand, are not hatched, representing that they have not been referenced.

Page 310 in low-tier storage 302, however, has recently been referenced. Thus, page 310 is illustrated as darkly hatched. Further, candidate block 326 may have been created for page 310, illustrated by dashed line 324. As illustrated, candidate block 326 includes 4 pages starting with page 310. Thus, unlike hot block 322, it may originate from a section of storage system 300 in which the block size is 4 pages.

FIG. 3B depicts a second view of a storage system with a hot-block space upon the hot-block requirements for the candidate block being met, in accordance with embodiments of the present disclosure. In FIG. 3B, page 310 has been relocated to LRU space 304, and thus the pages in LRU space have been shifted down, requiring a buffer-pool maintenance latch. Thus, page 314 is no longer the most recently referenced page in LRU space 304, page 318 is now the least recently referenced page in LRU space 403, and page 320 has been removed from LRU space 304.

As illustrated in FIG. 3B, page 330, the second page within candidate block 326, has been referenced. If the hot-block requirement for candidate block 326 requires that 50% of the pages in candidate block 326 be referenced, the hot-block requirements would be met. Thus, the storage system may relocate the pages in candidate block 326 to hot-block space 306.

This relocation is illustrated in FIG. 3C. In FIG. 3C, the storage system has relocated the pages belonging to candidate block 326 to hot-block space 306, resulting in hot-block 332. This included, for example, relocating page 310 from LRU space 304 and pages 330 and 334 from low-tier storage 302. Further, even though page 334 has not yet been referenced, it has been migrated to hot-block space 306 as part of the hot block. As noted previously, the relocation of page 310 from LRU space 304 to hot-block space 306 could involve moving page 310 to a different physical location within the memory. However, this relocation could alternatively simply be a logical relocation, in which page 310 remains in the same physical space in memory, but is recorded as being located in hot-block space 306. In some embodiments, this may only be feasible if sufficient space is available adjacent to page 310 in memory for the remainder of the pages in hot-block 332.

Further, this relocation has resulted in an empty slot in LRU space 304. In some embodiments, the storage system could, as a result, relocate page 320 back into LRU space 304. The storage system could also allow the empty slot to remain in LRU space 304, waiting to fill it when another page is referenced.

Finally, because candidate block 326 has been relocated to hot-block space 306, the system has created a second candidate block, candidate block 336. The system may then monitor the page references of the system, and determine whether to relocated candidate block 336 to hot-block space 306 based on the same hot-block requirements applied to candidate block 326 (i.e., hot block 332). On the other hand, the system may apply a relaxed set of hot-block requirements to candidate block 336, on the assumption that candidate block 336 is more likely to become a hot block due to the immediately previous pages (i.e., the pages of hot block 332) being relocated as a hot block.

FIG. 1-3C illustrate methods and a system by which a series of pages could be added to a hot-block space in a buffer pool as a hot block. Upon being added to a hot-block space, a hot block would, in some embodiments, remain in the hot-block space until the pages in are no longer referenced sufficiently often to remain in the hot-block queue. This may be referred to herein as the hot block no longer being sufficiently active. There are several methods by which a hot block could be determined to be no longer sufficiently active based on the circumstances of the computer system and the preferences of the system users. Most embodiments involve a determination of whether the benefit of avoiding LRU maintenance latches by storing the hot block in the hot-block space is likely outweighed by the space dedicated to the hot block in the hot-block space.

Figure 4:
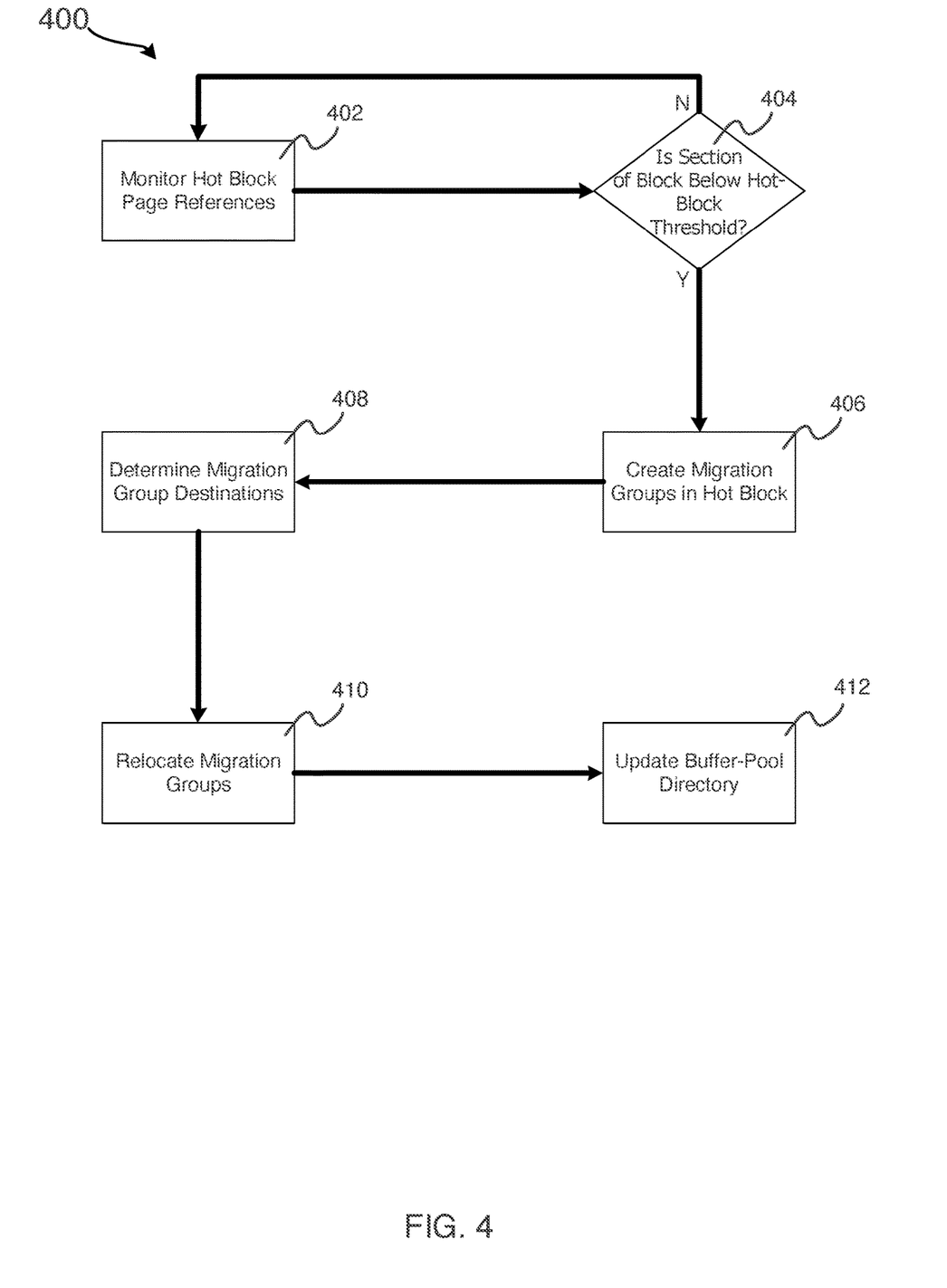
FIG. 4 depicts a method of removing pages from a hot-block space, in accordance with embodiments of the present disclosure.

FIG. 4 depicts a method 400 of removing pages from a hot-block space, in accordance with embodiments of the present disclosure. Like methods 100 and 200, method 400 may be performed, for example, by a storage controller of a computer system, a central processing unit in the computer system, a host of the computer system, or a hypervisor of a system. For the purpose of this discussion, the actions of method 400 will be referenced as performed by "the system."

Method 400 begins in operation 402, in which references to the pages in a hot block are monitored. This may occur, for example, by cross referencing a list of pages in the hot block in a buffer-pool directory with the page references performed by the system. Based on these monitored references, the system may determine, in operation 404, whether a section of the hot block is below a hot-block threshold. This hot-block threshold may take the form, for example, of a threshold number of references over a period of time (e.g., 1 reference every 5 seconds). The hot-block threshold may be customizable based on the system configurations and the user preferences. For example, users who are particularly concerned about using more buffer pool space than necessary may set the hot-block threshold relatively high (e.g., 2 references every 4 seconds). This may make it less likely for a page in a hot block to remain above the hot-block threshold. Users who are particularly concerned about system efficiency, however, may wish to avoid LRU maintenance latches while still maintaining quick access to the hot block, and may set the hot-block threshold relatively low (e.g., 1 reference every 15 seconds). This may make it more likely for a page in a hot block to remain above the hot-block threshold.

In some embodiments, the "section of the block" referenced in operation 404 may refer to the entire hot block. In other words, when making a determination in operation 404, the system may, in some embodiments, average the page references of every page in the hot block. For example, a hot block may contain 4 pages, the first three of which have been referenced 2 time in the last 20 seconds. However, the $4^{th}$ page may have been referenced 14 times in the last 20 seconds. In this example, the system may calculate an average of each page's reference numbers, resulting in an average of 4 references every 20 seconds for the entire hot block.

However, in some embodiments, the "section of the block" referenced in operation 404 may refer to a non-complete portion of the hot block. For example, the first 50% of the pages in a hot block may still be referenced very regularly, but the second 50% of the pages in the hot block may still be referenced very infrequently. In this example, operation 404 may involve calculating whether the second 50% of the pages in the hot block are below the hot-block threshold. In some embodiments, operation 404 may analyze the pages of the hot block to attempt to identify a series of continuous pages for which the average number of references is below a hot-block threshold. In some embodiments, operation 404 may also include a determination of whether a section of the hot block that has infrequently referenced pages is large enough to have a significantly negative impact on the space available in the buffer pool. For example, in a system with a hot-block threshold of 3 references every 10 seconds, if a section of 2 continuous pages in a 100-page hot block has not been referenced in over a minute, the system may ignore that section as not sufficiently large to be relevant. However, in that same system, if a section of 20 continuous pages in a 500-page hot block has been referenced, on average, 3 times every 12 seconds, the system may determine that that section is below the hot-block threshold.

If the system determines, in operation 404, that no section of the hot block is below the hot-block threshold, the system continues to monitor the references to the pages in the hot block in operation 402. However, if the system determines that at least one section of the hot block is below the hot-block threshold, the system may create migration groups in the hot block in operation 406. These migration groups may take the form of series of continuous pages from the hot block that exhibit similar reference patterns.

For example, a hot block may contain 10 pages. If the first four pages have been referenced an average of 2 times every five seconds, the fifth and sixth pages have been referenced an average of 2 times every 16 seconds, and the seventh through $10^{th}$ pages have been referenced an average of 1 time every 50 seconds, the system may form three migration groups. The first migration group may include the first four pages, the second migration group may include the fifth and sixth pages, and the third migration group may include the seventh through tenth pages. Forming migration groups based on the reference patterns of adjacent pages may be helpful because it may be beneficial to migrate different series of pages to different locations (e.g., to the LRU space or to hard disk).

As discussed previously, however, in some embodiments of method 400, the system may consider the page references of all pages of the hot block together (e.g., in a hot-block average) when determining, in operation 404, whether a section of the hot block is below the hot-block threshold. In some of these embodiments, the system may still create migration groups in operation 406. For example, the system may determine, in operation 202, that a 10-page hot block with the first 7 pages above the hot-block threshold, but the last 3 pages significantly below the hot-block threshold, is, on average, below the hot-block threshold. The system may then, in operation 406, create two migration groups: the first migration group may contain the first 7 pages, and the second migration group may contain the last three pages.

However, in other such embodiments, the system may not create migration groups in operation 406. Rather, if the average reference time of all the pages of a hot block is found to be below the hot-block threshold, the system may treat the entire block as below the hot-block threshold.

Forming migration groups of different combinations of hot-block pages may offer different benefits depending on system properties and user preferences. For example, a migration group that is formed of the entire hot block may enable faster relocation of the pages in the hot block, because only one destination may be involved. However, if the hot block contains a string of continuous not "hot" pages, particularly at the end of the hot block (e.g., a series of the last 10 pages in a 30-page hot block) creating a migration group with just those not "hot" pages may allow the system to migrate the not "hot" pages to a separate location than the other pages.

At the other extreme, a migration group may also be formed solely with individual pages. Thus, a 10-page hot block may result in 10 migration groups. This may be beneficial, for example, in hot blocks in which there is not a large continuous series of pages that are above the hot-block threshold or below the hot-block threshold. If the reference patterns of the pages in a hot block appear to be evenly distrusted and random throughout the pages, treating each individual page as a migration group may be beneficial.

As such, the granularity of the migration groups may be fine tuned for the situation. In some embodiments, not hot individual pages may be beneficial if the number of pages below the hot-block threshold are distributed randomly in the hot block. However, not "hot" individual pages only use a bit of storage, but relocating them to disk or the LRU space individually may cause complications for maintaining LRU-space records or hot-block space records. For example, in a block of 40 pages, if 5 pages are removed to disk, the result may be six hot blocks remaining that are each approximately 6 pages long.

Once the migration groups are created in operation 406, the migration group destinations are calculated in operation 408. These destinations may represent the places to which each migration group is to be located. The migration destination, for example, could be determined by comparing the average reference times of a migration group with reference times in the LRU list. However, these destinations may also be based off of individual reference times by comparing the reference time of each page to the reference times of each page in the LRU. While this may be beneficial in increasing the chances of a page (or series of pages) getting to their proper destination, it may also consume a lot of system resources and create slowdowns. For example, in a LRU space with 10,000 pages, comparing each migration group with the reference times of each 10,000 pages may take a long time.

Thus, in some embodiments of operation 408, the system could determine average positions in the LRU (or outside the LRU) to relocate migration groups to. The granularity of these average positions may vary depending on how much a user values efficiency of the system (e.g., reducing maintenance latches) vs how much the user values confirming that each page in the hot block is relocated to the exact proper position. For example, a basic average position may be determined by comparing the average reference time of the migration group to the highest and lowest reference times of the pages in the LRU list. If the average reference time of the migration group is between those two times, the destination may be based on the relative proximity of the average reference time to those two LRU-list times. For example, if the highest reference time in the LRU list is 110 seconds ago, and the lowest reference time in the LRU list is 10 seconds ago, and the average reference time of the migration group is 60 seconds ago (i.e., halfway between the two LRU-list times) the destination for the migration group may be the midpoint of the LRU list.

On the other hand, a more complex average position may be determined by diving the LRU into smaller section. For example, the LRU may be divided into quartiles (e.g., four equal series of pages). Determining the average position of a migration group, in this example, may first require determining the quartile into which the migration group should be located. This may occur, for example, by comparing the migration-group reference times of each start and end page of each LRU quartile. Operation 408 may then also determine the approximate difference between the migration group's reference time and each start and end page, and approximate the proper position in the quartile based on that difference.

In some embodiments, operation 408 may involve a very simple determination. For example, in some embodiments, operation 408 may include identifying the most-recently referenced page of the LRU, and preparing to move the migration groups to immediately before that most-recently referenced page.

Once the migration group destinations are located in operation 408, the migration groups are relocated to their respective destinations in operation 410. For example, 20-page hot block may have been broken into five migration groups in operation 406. The first and fifth migration groups may have very recent average reference times, the second migration group may have a somewhat recent average reference time, the third migration group may have a somewhat distant average reference time, and the fourth migration group may have a very distant average reference time. In this example, operation 410 may involve relocating the second migration group to near the "beginning" of the LRU space (i.e., moving the migration group to the LRU space and adding the migration group to near the beginning, most-recent section of the LRU list). Further, operation 410 may also involve relocating the third migration group to near the "end" of the LRU space (i.e., the space of the LRU list that is opposite the "beginning" of the LRU list), and relocating the fourth migration group to a slower tier of storage. In this example, operation 410 may also involve maintaining the first and fifth migration groups in the hot-block space, resulting in two partial hot blocks.

Once the migration groups are updated in operation 410, the buffer-pool directory is updated in operation 412. The nature of the updates to the buffer-pool directory may depend on the migrations that took place in operation 410. For example, if a partial hot block remains in the hot-block space (for example, the first and fifth migration groups discussed above), the system may update the entry for the hot block to, for example, account for the reduced number of pages in the hot block. In some instances, this may also include creating a second hot-block entry (for example, for the fifth migration group discussed above.

In some embodiments, updating the buffer-pool directory may take account of which pages were relocated to the LRU, and to what positions in the LRU. Further, updating the buffer-pool directory may take into account the pages in the migration groups that were relocated to a slower storage tier. In other words, operation 412 may determine which pages were removed from the buffer pool, and update the buffer-pool directory to no longer include entries for these pages.

Figure 5:
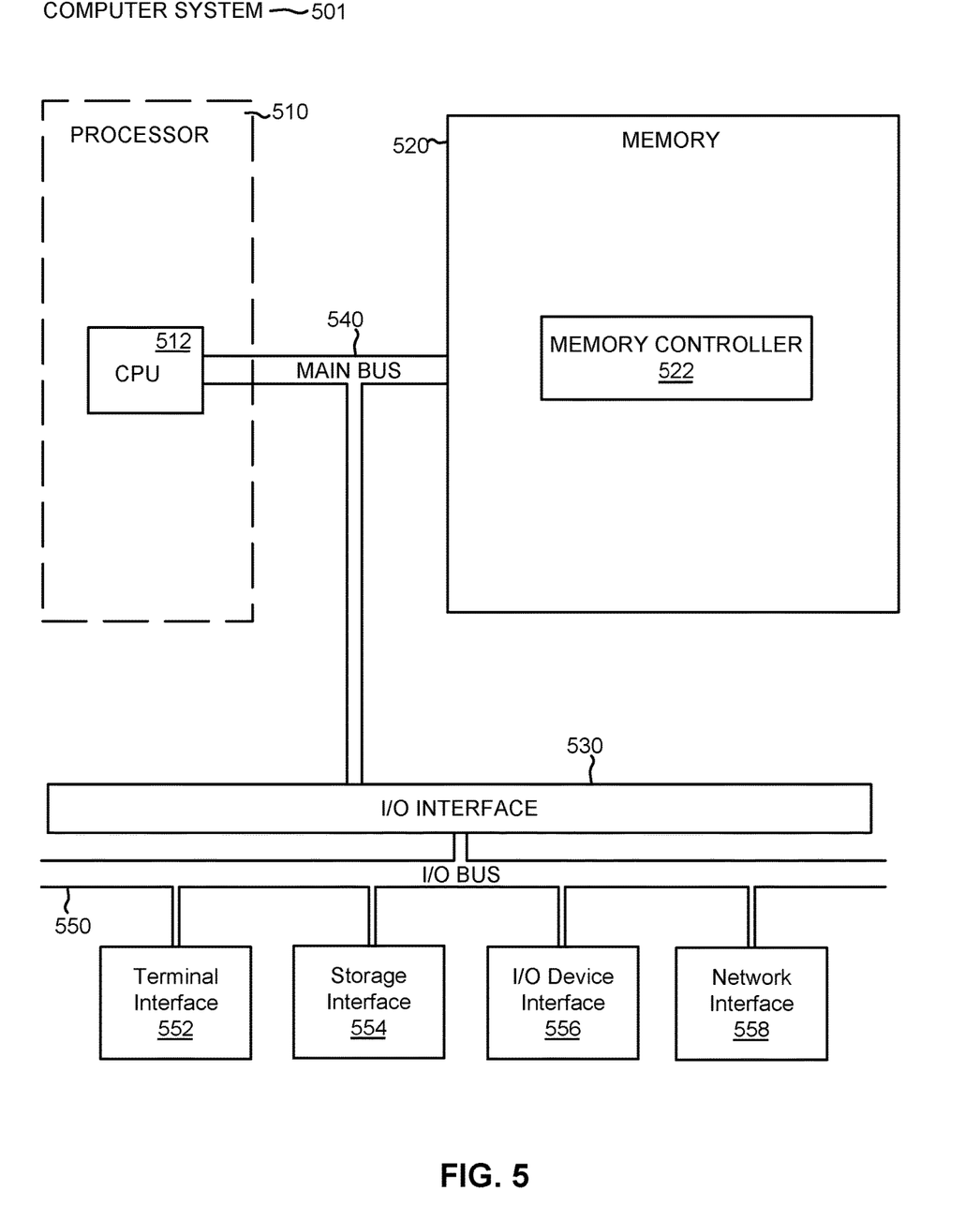
FIG. 5 depicts the representative major components of a computer system that may be used in accordance with embodiments.

FIG. 5 depicts the representative major components of an example Computer System 501 that may be used in accordance with embodiments of the present disclosure. The particular components depicted are presented for the purpose of example only and are not necessarily the only such variations. The Computer System 501 may include a Processor 510, Memory 520, an Input/Output Interface (also referred to herein as I/O or I/O Interface) 530, and a Main Bus 540. The Main Bus 540 may provide communication pathways for the other components of the Computer System 501. In some embodiments, the Main Bus 540 may connect to other components such as a specialized digital signal processor (not depicted).

The Processor 510 of the Computer System 501 may include one or more CPUs 512. The Processor 510 may additionally include one or more memory buffers or caches (not depicted) that provide temporary storage of instructions and data for the CPU 512. The CPU 512 may perform instructions on input provided from the caches or from the Memory 520 and output the result to caches or the Memory 520. The CPU 512 may include one or more circuits configured to perform one or methods consistent with embodiments of the present disclosure. In some embodiments, the Computer System 501 may contain multiple Processors 510 typical of a relatively large system. In other embodiments, however, the Computer System 501 may be a single processor with a singular CPU 512.

The Memory 520 of the Computer System 501 may include a Memory Controller 522 and one or more memory modules for temporarily or permanently storing data (not depicted). In some embodiments, the Memory 520 may include a random-access semiconductor memory, storage device, or storage medium (either volatile or non-volatile) for storing data and programs. The Memory Controller 522 may communicate with the Processor 510, facilitating storage and retrieval of information in the memory modules. The Memory Controller 522 may communicate with the I/O Interface 530, facilitating storage and retrieval of input or output in the memory modules. In some embodiments, the memory modules may be dual in-line memory modules.

The I/O Interface 530 may include an I/O Bus 550, a Terminal Interface 552, a Storage Interface 554, an I/O Device Interface 556, and a Network Interface 558. The I/O Interface 530 may connect the Main Bus 540 to the I/O Bus 550. The I/O Interface 530 may direct instructions and data from the Processor 510 and Memory 520 to the various interfaces of the I/O Bus 550. The I/O Interface 530 may also direct instructions and data from the various interfaces of the I/O Bus 550 to the Processor 510 and Memory 520. The various interfaces may include the Terminal Interface 552, the Storage Interface 554, the I/O Device Interface 556, and the Network Interface 558. In some embodiments, the various interfaces may include a subset of the aforementioned interfaces (e.g., an embedded computer system in an industrial application may not include the Terminal Interface 552 and the Storage Interface 554).

Logic modules throughout the Computer System 501—including but not limited to the Memory 520, the Processor 510, and the I/O Interface 530—may communicate failures and changes to one or more components to a hypervisor or operating system (not depicted). The hypervisor or the operating system may allocate the various resources available in the Computer System 501 and track the location of data in Memory 520 and of processes assigned to various CPUs 512. In embodiments that combine or rearrange elements, aspects of the logic modules' capabilities may be combined or redistributed. These variations would be apparent to one skilled in the art.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method comprising:
    detecting a reference to a first page in a storage system;
    creating, based on the detecting, a first candidate block for the first page, wherein the first candidate block is a hypothetical block that comprises a continuous series of pages that begins with the first page;
    monitoring subsequent references to pages within the first candidate block;
    determining, based on the monitoring, that the first candidate block meets a first set of hot-block requirements; and
    relocating, based on the determining, the first candidate block to a hot-block space in a buffer pool, resulting in a first hot block.

2. The method of claim 1, further comprising:
    moving, based on the detecting, the first page to an LRU space in the buffer pool;
    wherein the relocating comprises relocating the first page from the LRU space to the hot-block space.

3. The method of claim 1, wherein the first set of hot-block requirements comprises a requirement that 50% of the pages within the first candidate block be referenced.

4. The method of claim 1, further comprising:
    creating, based on the determining, a second candidate block for a series of pages adjacent to the first candidate block's location prior to the relocating; and
    determining that the second candidate block meets a second set of hot-block requirements, wherein the second set of hot-block requirements is relaxed as compared to the first set of hot-block requirements.

5. The method of claim 4, wherein the second set of hot-block requirements comprises a requirement that 50% of the first 50% of the pages within the second candidate block be referenced.

6. The method of claim 1, further comprising:
    determining, after the relocating, that a first section of the first hot block is below a hot-block threshold;
    relocating, based on the determining that the first section of the first hot block is below the hot-block threshold, the first section to an LRU space in the buffer pool.

7. The method of claim 6, wherein the first section of the hot block comprises the entire first hot block.

8. The method of claim 6, wherein the first section of the hot block comprises a non-complete portion of the first hot block, and wherein the method further comprises:
    relocating a second section of the first hot block to a lower tier of storage;
    retaining a third section of the first hot block in the hot-block space.

9. The method of claim 6, wherein the first section of the hot block comprises a non-complete portion of the first hot block, and wherein the method further comprises relocating a second section of the first hot block to a lower tier of storage.

10. The method of claim 6, further comprising determining a destination for the first section, wherein the determining the destination for the first section comprises:
   calculating an average page-reference time for the first section;
   calculating a first relative proximity between the average page reference time and a highest reference time in an LRU list for the LRU space;
   calculating a second relative proximity between the average page reference time and a lowest reference time in an LRU list for the LRU space; and
   comparing the first relative proximity and the second relative proximity.

11. A system comprising:
   a processor; and
   a memory in communication with the processor, the memory containing program instructions that, when executed by the processor, are configured to cause the processor to perform a method, the method comprising:
   detecting a reference to a first page in a storage system;
   creating, based on the detecting, a first candidate block for the first page, wherein the first candidate block comprises a continuous series of pages that begins with the first page;
   monitoring subsequent references to pages within the first candidate block;
   determining, based on the monitoring, that the first candidate block meets a first set of hot-block requirements; and
   relocating, based on the determining, the first candidate block to a hot-block space in a buffer pool, resulting in a first hot block.

12. The system of claim 11, wherein the method further comprises:
   moving, based on the detecting, the first page to an LRU space in the buffer pool;
   wherein the relocating comprises relocating the first page from the LRU space to the hot-block space.

13. The system of claim 11, wherein the method further comprises:
   creating, based on the determining, a second candidate block for a series of pages adjacent to the first candidate block's location prior to the relocating; and
   determining that the second candidate block meets a second set of hot-block requirements, wherein the second set of hot-block requirements is relaxed as compared to the first set of hot-block requirements.

14. The system of claim 11, wherein the method further comprises:
   determining, after the relocating, that a first section of the first hot block is below a hot-block threshold;
   relocating, based on the determining that the first section of the first hot block is below the hot-block threshold, the first section to an LRU space in the buffer pool.

15. The system of claim 14, wherein the first section of the hot block comprises the entire first hot block.

16. The system of claim 14, wherein the first section of the hot block comprises a non-complete portion of the first hot block, and wherein the method further comprises:
   relocating a second section of the first hot block to a lower tier of storage;
   retaining a third section of the first hot block in the hot-block space.

17. The system of claim 14, wherein the first section of the hot block comprises a non-complete portion of the first hot block, and wherein the method further comprises relocating a second section of the first hot block to a lower tier of storage.

18. The system of claim 14, wherein the method further comprises determining a destination for the first section, wherein the determining the destination for the first section comprises:
   calculating an average page-reference time for the first section;
   calculating a first relative proximity between the average page reference time and a highest reference time in an LRU list for the LRU space;
   calculating a second relative proximity between the average page reference time and a lowest reference time in an LRU list for the LRU space; and
   comparing the first relative proximity and the second relative proximity.

19. A computer program product, the computer program product comprising a computer readable storage medium having program instructions embodied therewith, the program instructions executable by a computer to cause the computer to:
   detect a reference to a first page in a storage system;
   create, based on the detecting, a first candidate block for the first page, wherein the first candidate block comprises a continuous series of pages that begins with the first page;
   monitor subsequent references to pages within the first candidate block;
   determine, based on the monitoring, that the first candidate block meets a first set of hot-block requirements; and
   relocate, based on the determining, the first candidate block to a hot-block space in a buffer pool, resulting in a first hot block.

20. The computer program product of claim 19, wherein the program instructions further cause the computer to:
   move, based on the detecting, the first page to an LRU space in the buffer pool;
   wherein the relocating comprises relocating the first page from the LRU space to the hot-block space.

21. The computer program product of claim 19, wherein the program instructions further cause the computer to:
   create, based on the determining, a second candidate block for a series of pages adjacent to the first candidate block's location prior to the relocating; and
   determine that the second candidate block meets a second set of hot-block requirements, wherein the second set of hot-block requirements is relaxed as compared to the first set of hot-block requirements.

22. The computer program product of claim 19, wherein the program instructions further cause the computer to:
   determine, after the relocating, that a first section of the first hot block is below a hot-block threshold;
   relocate, based on the determining that the first section of the first hot block is below the hot-block threshold, the first section to an LRU space in the buffer pool.

23. The computer program product of claim 22, wherein the first section of the hot block comprises the entire first hot block.

24. The computer program product of claim 22, wherein the first section of the hot block comprises a non-complete portion of the first hot block, and wherein the program instructions further cause the computer to:

relocate a second section of the first hot block to a lower tier of storage;

retain a third section of the first hot block in the hot-block space.

25. The computer program product of claim 22, wherein the program instructions further cause the computer to determine a destination for the first section, wherein the determining the destination for the first section comprises:

calculating an average page-reference time for the first section;

calculating a first relative proximity between the average page reference time and a highest reference time in an LRU list for the LRU space;

calculating a second relative proximity between the average page reference time and a lowest reference time in an LRU list for the LRU space; and comparing the first relative proximity and the second relative proximity.

\* \* \* \* \*